United States Patent [19]

Klemann et al.

[11] Patent Number: 5,059,442

[45] Date of Patent: Oct. 22, 1991

[54] PRIMARY AMIDE ESTERS AS LOW CALORIE FAT MIMETICS

[75] Inventors: Lawrence P. Klemann, Somerville; John W. Finley, Whippany; Ronald G. Yarger, Convent Station, all of N.J.

[73] Assignee: Nabisco Brands, Inc., Parsippany, N.Y.

[21] Appl. No.: 409,237

[22] Filed: Sep. 19, 1989

[51] Int. Cl.$^5$ .......................... A23L 1/09; C09F 5/00
[52] U.S. Cl. ................... 426/531; 260/404; 260/404.5; 426/601; 426/611; 426/804
[58] Field of Search ............... 426/601, 611, 804, 531; 260/404, 404.5

[56]  References Cited

U.S. PATENT DOCUMENTS

| | | | |
|---|---|---|---|
| 519,980 | 5/1894 | Winter . | |
| 3,495,010 | 2/1970 | Fossel | 424/312 |
| 3,600,186 | 8/1971 | Mattson et al. | 99/1 |
| 3,637,774 | 1/1972 | Babayan et al. | 260/410.6 |
| 3,876,794 | 4/1975 | Rennhard | 426/152 |
| 3,968,169 | 7/1976 | Seiden et al. | 260/615 |
| 4,005,195 | 1/1977 | Jandacek | 424/180 |
| 4,005,196 | 1/1977 | Jandacek et al. | 424/180 |
| 4,046,874 | 9/1977 | Gabby et al. | 424/73 |
| 4,304,768 | 12/1981 | Staub et al. | 424/180 |
| 4,446,034 | 5/1984 | Kolse et al. | 252/8.8 |
| 4,446,165 | 5/1984 | Roberts | 426/602 |
| 4,461,782 | 7/1984 | Robbins | 426/549 |
| 4,626,441 | 12/1987 | Wolkstein | 426/548 |
| 4,631,196 | 12/1986 | Zeller | 426/580 |
| 4,678,672 | 7/1987 | Dartey et al. | 426/19 |

FOREIGN PATENT DOCUMENTS

| | | |
|---|---|---|
| 0233856 | 2/1987 | European Pat. Off. . |
| 0236288 | 2/1987 | European Pat. Off. . |
| 0256585 | 2/1987 | European Pat. Off. . |
| 2021579 | 12/1979 | United Kingdom . |

OTHER PUBLICATIONS

K. Oette and Tschae Sang Tschung, Hoppe-Seyler's A. Physiol Chem. Bd. 361, S. 1179-1191 Aug. (1990). English translation.

Booth, A. N. and Gros, A. T., 40 JAOCS 551-553 (1963).

Garner, C. W. and Smith, L. C., 39 BBRC 672-682 (1970).

Goodman and Gilman's Pharmacological Basis of Therapeutics, 7th ed., 1002-1003 (1985).

Gottenbos, J. J., Chap. 8 in Dietary Fat Requirements, AOCS 107-112 (1988).

Hamm, D. J., 49 J Food Sci. 419-428 (1984).

Haumann, B. J., 63 JAOCS 278-288 (1986).

LaBarge, R. G., 42 Food Tech. 84-90 (1988).

Michael, W. R. and Coots, R. H., 20 Tox. App. Pharm. 334-345 (1971).

Merten, H. L., 18 J. Ag. Food Chem. 1002-1004 (1970).

Oette, K. and Tschung, T. S., 361 H-S. Z Phys. Chem., 1179-1191 (1980), English Summary Only.

Stryker, W. A., 31 Arch. Path 670-692 (1941).

*Primary Examiner*—Donald E. Czaja
*Assistant Examiner*—Evan Federman

[57]  ABSTRACT

Primary amide esters, ester amide derivatives of the general formula:

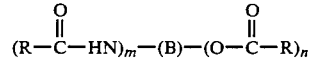

where
B is an acyclic aliphatic group having from 2 to 6 carbons,
m = 1 to 3,
n = 1 to 3, and
each R is, independently, an aliphatic, ether or ester group
having 1 to 29 carbon atoms are edible, preferably partially digestible, fat replacements for foods.

66 Claims, No Drawings

PRIMARY AMIDE ESTERS AS LOW CALORIE FAT MIMETICS

BACKGROUND OF THE INVENTION

This invention relates to the use of primary amide esters, notably alkanolamines having a two to six carbon backbone to which are attached fatty groups in at least one ester and at least one primary amide linkage, as edible, preferably partially digestible, fat replacements in foods and pharmaceuticals.

Reduction in caloric intake can be significantly enhanced by dietary fat reduction, since fats provide nine calories per gram compared to four calories per gram provided by protein or carbohydrates. Furthermore, dietary fats represent approximately 40 to 45% of the U.S. daily caloric intake, and the percentage has risen since 1936 (Merten, H. L., 18 J. Agr. Food Chem. 1002 (1970)). Not only are fats high in calories, but certain fats appear to pose a health risk when consumed in large quantities over time. A number of national advisory committes on nutrition have made recommendations differing in detail, but the common theme is a reduction in the total amount of fat in our diet (Gottenbos, J. J., chapter 8 in Beare-Rogers, J., ed., Dietary Fat Requirements in Health and Development, A.O.C.S. 1988, page 109). Hence, major research efforts have focused on ways to produce food substances that provide the same functional and organoleptic properties as fats, but not the calories.

Mineral oil, sugar fatty acid polyesters, trialkoxytricarballylates, trialkoxycitrates, trialkoxyglyceryl ethers, jojoba wax, silicone oils and various polysaccharides have been suggested for use as edible fat replacements. (For recent reviews, see Hamm, D. J., 49 J. Food Sci. 419 (1984), Haumann, B. J., 63 J. Amer. Oil Chem. Soc. 278 (1986), and LaBarge, R. G., 42 Food Tech. 84 (1988).) These low calorie replacement fats, whether they be triglyceride analogues or polymeric materials, are generally engineered or selected to retain fat properties in foods while removing the susceptibility toward hydrolysis during digestion, thus rendering the compounds nonabsorbable or nondigestible.

Side effects from the consumption of nondigestible fat materials have been observed for many years. Mineral oil, patented as an edible fat replacement in a composition as early as 1894 (U.S. Pat. No. 519,980 to Winter), acts as a laxative, interferes with the absorption of water and fat soluble substances, and elicits foreign body reactions in the intestinal mucosa and other tissues (Stryker, W. A., 31 Arch. Path. 670 (1941), more recently summarized in Goodman and Gilman's The Pharmacological Basis of Therapeutics, 7th ed., Macmillan Pub. Co., N.Y., 1985, pp. 1002–1003).

The caloric availability and digestibility of a series of new-type fats, including amylose fatty acid esters, diglyceride esters of succinic, fumaric, and adipic acids, and polymeric fats from stearic, oleic and short-chain dibasic acids, were assessed in the 1960's by the U.S.-D.A. at the Southern and Western Regional Research Laboratories (see Booth, A. N., and Gros, A. T., 40 J. Amer. Oil Chem. Soc. 551 (1963) and the references cited therein). Rats fed the experimental fats exhibited undesirable gastrointestinal side effects similar to what had already been observed with mineral oil consumption by people. In several of the balance studies, the diarrhea was so extreme that digestibility coefficients could not be calculated for the trial feedings (ibid., Table I, p. 552).

More recently, sucrose polyesters, nondigestible mixtures of sucrose hexa-, hepta-, and octa- fatty acid esters, have been suggested as low calorie replacements of edible fats and oils in food compositions (U.S. Pat. No. 3,600,186 to Mattson and Volpenhein, U.S. Pat. No. 4,446,165 to Roberts, and U.S. Pat. No. 4,461,782 to Robbins and Rodriguez). Sucrose polyesters can also cause undesirable gastrointestinal side effects. In initial trials, the compounds passed through the body causing frank anal leakage. To combat this, various hardened fats, notably hydrogenated palm oils and synthetic cocoa butters, have been employed as antianal leakage agents to be used with the polyesters (U.S. Pat. No. 4,005,195 to Jandacek, U.S. Pat. No. 4,005,196 to Jandacek and Mattson, and U.S. Pat. No. 4,461,782 to Robbins and Rodriguez), and saturated residues have been incorporated into the polyester molecules (Eur. Pat. Ap. Nos. 236,288 to Bernhardt and 256,585 to van der Plank and Rozendaal).

Polyglycerol esters (esterified polymerized glycerol) comprise another class of fat replacements. Linear and cyclic polyglycerols of different chain lengths have been prepared for consumption in food (U.S. Pat. No. 3,968,169 to Seiden and Martin), and substituted with a range of fatty acid residues (U.S. Pat. No. 3,637,774 to Babayan and Lehman) for use in margarine, imitation butter, cheese spreads, dips, puddings, icings, salad dressings, sauces, frozen desserts, including ice cream and sherbet, and the like (U.S. Pat. Nos. 3,637,774, supra, and 4,046,874 to Gabby et al.). The fatty acid moieties of this class of fat replacements can be catabolized if the polymer is short, but polyglycerol itself is not metabolized (Michael, W. R., and Coots, R. H., 20 Toxicol. Appl. Pharm. 334 (1971). And the laxative effect of polyglycerol esters is so pronounced that the compounds have been suggested for use as fecal softeners (U.S. Pat. No. 3,495,010 to Fossel).

Hamm, supra at 427, tested trialkoxytricarballylate, a structural triglyceride analogue with the ester bonds reversed as compared to natural fat, and jojoba wax as possible fat replacements. He found that laboratory rats derived little, if any, caloric value when fed the compounds, but anal leakage of the unabsorbed low calorie oils occurred. At higher dosages, weakness, depression and death were also observed in some animals.

A number of branched and linear polysaccharides have also been suggested as fat replacements in foods. Polydextrose, a tasteless non-sweet low calorie bulking agent formed by the random polymerization of glucose with lesser amounts of sorbitol and citric acid, has been used as a replacement for fat and sugar in a variety of common processed foods, including desserts (U.S. Pat. No. 4,626,441 to Wolkstein), dairy products (U.S. Pat. No. 4,631,196 to Zeller) and crackers (U.S. Pat. No. 4,678,672 to Dartey and Biggs). Polyglucoses and polymaltoses, prepared by the polycondensation of saccharides in the presence of a polycarboxylic acid catalyst, were synthesized and used in dietetic foods in U.S. Pat. No. 3,876,794 to Rennhard. Again, however, it has been found that ingestion of polysaccharides and/or polyols in amounts as low as 30 to 100 grams per day can cause some people to suffer from gastrointestinal discomfort and diarrhea, and dietary fiber preparations have been incorporated into polysaccharide and/or polyol-containing foodstuffs to help inhibit the diarrheal effect (U.S. Pat. No. 4,304,768 to Staub et al.).

SUMMARY OF THE INVENTION

An object of the present invention is to provide a new group of fat replacement compounds, members of which are more compatible with normal digestion. More particularly, it is an object of a preferred embodiment of the present invention to provide a more digestible fat replacement which minimizes or avoids diarrhea and other laxative side effects. It is a further object of a preferred embodiment of the present invention to provide a partially digestible fat replacement which may, if desired, be engineered to provide essential or desirable fatty acids.

These and other objects are accomplished by the present invention which describes a new class of edible fat mimetics, methods of using them, and food compositions employing them. The compounds of this invention are alkanolamines having a two- to six-carbon backbone to which are attached fatty groups in at least one ester and at least one primary amide linkage and may be described by the following general formula:

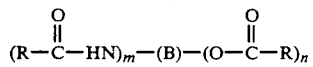

where
B is an organic radical having from 2 to 6 carbons,
m = 1 to 3,
n = 1 to 3, and
each R is, independently, a $C_1$ to $C_{29}$ aliphatic group, a $C_2$ to $C_{29}$ ether group of the formula R'—O—R"—, or a $C_2$ to $C_{29}$ ester group of the formula R"—O—(CO)—R'— or R'—(CO)—O—R"—, where R'— and R"— are, independently, aliphatic groups.

DETAILED DESCRIPTION OF THE INVENTION

Garner and Smith synthesized dioctanoyl 2-amino-1-propanol to use as a substrate for lipase (in a study conducted in monomolecular films, Garner, C. W., and Smith, L. C., 39 Biochem. Biophys. Res. Commun. 672 (1970)). Oette and Tschung subsequently suggested lyceride derivatives as phospholipid analogues of possible pharmacological utility in promoting the in vivo formation of natural phospholipids (GB 2,021,579, p. 5, line 23). When fed to rats, aminomonoglyceride derivatives were found to be metabolized and accumulated in organ lipids, mostly in the liver, but also in adipose tissue (Oette, K., and Tschung, T. S., 361 Hoppe-Seyler's Z. Physiol. Chem. 1179 (1980)). The authors concluded that these monoglyceride analogues were metabolized to lecithin and cephalin analogues (GB 2,021,579, p. 5, line 6).

The present invention is based on the finding that primary amide esters, acylated alkanolamines which have a two- to six-carbon backbone substituted with at least one fatty acid ester (—O—(CO)—R) and at least one fatty acid primary amide (—NH—(CO)—R) functionality, can be used as low calorie fat mimetics in edible materials.

The primary amide esters of this invention comprise compounds having the following general formula:

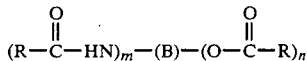

where:
B is an organic radical having from 2 to 6 carbons,
m = 1 to 3,
n = 1 to 3, and
each R is, independently, a $C_1$ to $C_{29}$ aliphatic group, a $C_2$ to $C_{29}$ ether group of the formula R'—O—R"—, or a $C_2$ to $C_{29}$ ester group of the formula

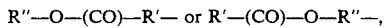

where R'— and R"— are, independently, aliphatic groups.

The compounds of this invention have a backbone, B (derived from an alkanolamine), to which are attached at least one fatty aliphatic, ether or ester group, R'in primary amide linkage, and at least one other fatty alkyl, ether or ester group, R'in ester linkage. The compounds may have as many as three amide groups (m) and three ester groups (n) attached to backbone B. Thus, this invention comprises acylated alkanolamines with 2 to 6 fatty groups, so long as the fatty groups are attached by at least one amide and at least one ester linkage. While the minimum number of fatty groups, m+n, is always 2 and the maximum can be has high as 6, the preferred compounds of this invention have m+n=3 to 4, i.e., those with 3 to 4 fatty groups.

Examples of alkanolamines forming the compound backbones are aminoethanol, aminopropanol, aminopropanediol, diaminopropanol, aminobutanol, diaminobutanol, aminobutanediol, diaminobutanediol, aminopentanol, diaminopentanol, aminopentanediol, diaminopentanediol, aminohexanol, diaminohexanol, aminohexanediol, and diaminohexanediol. Chemical descriptions and formulae used here include isomeric variations.

Backbone B may also be carbocyclic or heterocyclic rather than acyclic. This invention encompasses cyclohexyl derivatives having a six-membered carbon ring (which may be saturated or unsaturated) to which is attached at least one fatty group in ester linkage and at least one fatty group in primary amide linkage as described in the general formula supra. Thus, aminocyclohexanols, diaminocyclohexanols, aminocyclo hexanediols, diaminocyclohexanediols, their cyclohexene counterparts, and the like may form the compound backbones.

This invention further encompasses sugar derivatives such as acylated, esterified galactosamine (2-amino-2-deoxygalactose), 2-amino-2-deoxyribose, and the like. In these compounds, the backbone is a heterocyclic having 2 to 6 carbons to which are attached at least one fatty group in ester linkage and at least one in primary amide linkage as described above.

The R groups may be aliphatic groups, ether groups of the formula R'—O—R"—, or ester groups of the formula R"—O—(CO)—R' or R'—(CO)—O—R"—, where R'and R"are aliphatic groups. The R groups may be the same or different, and may comprise a mixture of fatty groups.

When the R groups are aliphatic, they may be derived from fatty acids of the formula RCOOH. The term "fatty acids" used here means organic fatty acids containing 2 to 30 carbons, and may be synthetic or natural, saturated or unsaturated, with straight or branched chains. Examples of fatty acids that can be used in this invention are acetic, propionic, butyric, caproic, caprylic, pelargonic, capric, undecanoic, lauric, myristic, palmitic, stearic, arachidic, behenic, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, and docosahexaenoic acids. Mixtures of fatty acids may also be used, such as those obtained from non-hydrogenated or hydrogenated soybean, safflower, sunflower, sesame, peanut, corn, olive, rice bran, canola, babassu nut, coconut, palm, palm kernel, lupin, nasturtium seed, mustard seed, cottonseed, low erucic rapeseed, butter or marine oils, or plant waxes such as jojoba. Specific fractions of natural or processed oils may also be used.

When the R groups are ether groups of the formula R'O—R"—, where R' and R" are aliphatic groups as defined above, the ether group (—O—) may occur anywhere in the $C_2$ to $C_{29}$ chain. The chain may be linear or branched, saturated or unsaturated. Ether R groups may be derived by using etheric carboxylic acids as acylating agents.

R may also be an ester group of the formula R"—O—($C_0$)—R' or R'($C_0$)—O—R", where R' and R" are as defined above. Thus, R may be a dicarboxylate-extended fatty ester group. By "dicarboxylate-extended" is meant a group formed from the reaction of fatty alcohols of the formula R"OH with dicarboxylic acids, such as, for example, malonic, succinic, glutaric or adipic acid. The resulting malonyl-, succinyl-, glutaryl- or adipoyl-fatty groups are, structurally, aliphatic alcohols with their chains extended by the dicarboxylic acid residue. Thus, malonyl-extended R would have the formula R"—O—(CO)—$CH_2$—, succinyl-extended would be R"—O—(CO)—$(CH_2)_2$—, glutaryl would be R"—O—(CO)—$(CH_2)_3$—, and so forth.

R may also be a derivative of an acylated hydroxycarboxylic acid with an ester group with the ester bond in the opposite direction as compared to dicarboxylate-extended ester groups. The resulting fatty groups are, structurally, fatty acids extended by hydroxycarboxylic acids or acylated hydroxy fatty acids. Thus, the hydroxyl group of an acid in the lactic acid series, for example, glycolic acid (hydroxyacetic, $CH_{20}H$—COOH) or hydracrylic acid (3-hydroxypropionic, $CH_{20}HCH_2COOH$) for example, may be acylated with a fatty acid (R"COOH) to yield an ester R group of the formula R"—(CO)—O—$CH_2$— (glycolic-extended), R"—(CO)—O—$CH_2$—$CH_2$— (hydracrylic-extended), and so forth. Any isomer of any hydroxycarboxylic acid may be used with any fatty acid, so long as the sum of the carbons in hydroxycarboxylic and fatty acid portions of the R group is less than or equal to 29. This type of ester R group may also be formed by acylating the hydroxyl group of an hydroxy fatty acid such as ricinoleic acid.

The R group will be selected to provide a discernible fatty character in the compounds. Thus, most of the R groups have 3 or more carbon atoms, with a percentage containing 3 to 23 (derived from acids having 4 to 24 carbons), more narrowly 9 to 19, and even more narrowly, 15 to 17 carbon atoms (derived from acids having 16 to 18 carbons). Preferred fat mimetics can have an array of R groups, selected to include 95% having 13 to 17 carbon atoms (derived from acids having 14 to 18 carbons). In one embodiment, the R groups are predominantly saturated and in the range of 13 to 17 carbon atoms (derived from saturated acids having 14 to 18 carbons). In another embodiment, the R groups are predominantly unsaturated (with a preponderance of monounsaturated moieties) and in the range of 15 to 17 carbon atoms (derived from predominantly monounsaturated acids having 16 to 18 carbons).

The preferred primary amide esters of this invention are partially digestible, and typically provide from about 0.5 to 8.5 kcal/gram, more narrowly 1.0 to 6.0 kcal/gram. In these preferred compounds, the R side groups show differential reactivity toward digestive enzymes, so that the compounds become more hydrophilic when catabolized. The more readily digestible residue R can be an essential or nutritionally desirable fatty acid such as linoleic acid. As with natural triglycerides, the more readily digestible residue R can also be a fatty acid having beneficial attributes such as, for example, those associated with conjugated linoleic acid isomers The primary amide esters of this invention may be incorporated either alone, or in combination with another fat and/or fat mimetic, into any food composition or used in conjunction with any edible material. The term "edible material" is broad and includes anything edible. Representative of edible materials which ca contain the fat mimetic compounds of this invention in full or partial replacement of natural fat are: frozen desserts, e.g., sherbet, ice cream, ices, or milk shakes; puddings and pie fillings; margarine substitutes or blends; flavored bread or biscuit spreads; mayonnaises and mustards; salad dressings; filled dairy products such as filled cream or filled milk; dairy or non-dairy cheese spreads; coffee lighteners, liquid and dried; flavored dips; frying fats and oils; reformed and comminuted meats; meat substitutes or extenders; pet foods; whipped toppings; compound coatings; frostings and fillings; cocoa butter replacements or blends; candy, especially fatty candies such as those containing peanut butter or chocolate; chewing gum; breakfast cereals; bakery products, e.g., cakes, breads, rolls, pastries, cookies, biscuits, and savory crackers; mixes or ingredient premixes for any of these; as well as flavor, nutrient, drug or functional additive delivery systems.

The following is a list of representative, but not limiting, examples of primary amide esters of this invention:

(A) Acylated ethanolamines having the general formula, $$(R-\overset{O}{\overset{\|}{C}}-HN)-CH_2-CH_2-(O-\overset{O}{\overset{\|}{C}}-R)$$

where
each R, is, independently, as defined above.

Specific illustrations of this type of acylated ethanolamine primary amide esters are, for example:

(1) 2-Oleoyloxyethyl Oleamide

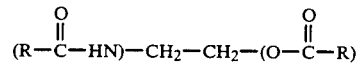

(2) 2-Oleoyloxyethyl Myristamide $$H_2C-NH-(CO)-(CH_2)_{12}CH_3$$
$$H_2C-O-(CO)-(CH_2)_7CH=CH(CH_2)_7CH_3$$

(3) 2-(5-Oxanonanoyl)ethyl Lauramide $$H_2C-NH-(CO)-(CH_2)_{10}CH_3$$
$$H_2C-O-(CO)-(CH_2)_3-O-(CH_2)_3CH_3$$

(4) 2-Palmitoylglycoylethyl Palmitamide $$H_2C-NH-(CO)-(CH_2)_{14}CH_3$$
$$H_2C-O-(CO)-CH_2-O-(CO)-(CH_2)_{14}CH_3$$

(B) Propyl amide ester derivatives having the general formula $$\begin{array}{l}(CH_2)X\\(CH_d)X_q\\(CH_e)X_t,\end{array}$$

where
d = 1 to 2,
e = 1 to 3
X =

$$-O-\overset{O}{\underset{\|}{C}}-R$$

(ester) or $$-NH-\overset{O}{\underset{\|}{C}}-R$$

(amide) groups, subject to the proviso that each molecule contain at least one ester and at least one amide group,
q = 0 to 1,
t = 0 to 1, subject to the proviso that q + t ≧ 1, and each R is, independently, as defined above.

Illustrations of this type of primary amide esters include:

(5) 3-Oleoyloxypropyl Oleamide $$H_2C-NH-(CO)-(CH_2)_7CH=CH(CH_2)_7CH_3$$
$$CH_2$$
$$H_2C-O-(CO)-(CH_2)_7CH=CH(CH_2)_7CH_3$$

(6) 2-Oleoyloxypropyl Oleamide $$H_2C-NH-(CO)-(CH_2)_7CH=CH(CH_2)_7CH_3$$
$$HC-O-(CO)-(CH_2)_7CH=CH(CH_2)_7CH_3$$
$$CH_3$$

(7) 2-Oleoyloxypropyl 1,3-Dioleamide $$H_2C-NH-(CO)-(CH_2)_7CH=CH(CH_2)_7CH_3$$
$$HC-O-(CO)-(CH_2)_7CH=CH(CH_2)_7CH_3$$
$$H_2C-NH-(CO)-(CH_2)_7CH=CH(CH_2)_7CH_3$$

(8) 2,3-Bis(oleoyloxy)propyl Oleamide $$H_2C-NH-(CO)-(CH_2)_7CH=CH(CH_2)_7CH_3$$
$$HC-O-(CO)-(CH_2)_7CH=CH(CH_2)_7CH_3$$
$$H_2C-O-(CO)-(CH_2)_7CH=CH(CH_2)_7CH_3$$

(9) 2-Palmitoyloxy-3-oleoyloxypropyl Oleamide $$H_2C-NH-(CO)-(CH_2)_7CH=CH(CH_2)_7CH_3$$
$$HC-O-(CO)-(CH_2)_{14}CH_3$$
$$H_2C-O-(CO)-(CH_2)_7CH=CH(CH_2)_7CH_3$$

(10) 1,3-Bis(oleoyloxy)propyl 2-Oleamide $$H_2C-O-(CO)-(CH_2)_7CH=CH(CH_2)_7CH_3$$
$$HC-NH-(CO)-(CH_2)_7CH=CH(CH_2)_7CH_3$$
$$H_2C-O-(CO)-(CH_2)_7CH=CH(CH_2)_7CH_3$$

(11) 1-Myristoyloxy-3-oleoyloxypropyl 2-Stearamide $$H_2C-O-(CO)-(CH_2)_7CH=CH(CH_2)_7CH_3$$
$$HC-NH-(CO)-(CH_2)_{16}CH_3$$
$$H_2C-O-(CO)-(CH_2)_{12}CH_3$$

(12) 2-(10-Oxadodecanoyl)propyl 1,3-Distearamide $$H_2C-NH-(CO)-(CH_2)_{16}CH_3$$
$$HC-O-(CO)-(CH_2)_8-O-CH_2-CH_3$$
$$H_2C-NH-(CO)-(CH_2)_{16}CH_3$$

(13) 2,3-Bis(pelargonylsuccinyloxy)propyl Lauramide $$H_2C-NH-(CO)-(CH_2)_{10}CH_3$$
$$HC-O-(CO)-(CH_2)_2-(CO)-O-(CH_2)_8CH_3$$
$$H_2C-O-(CO)-(CH_2)_2-(CO)-O-(CH_2)_8CH_3$$

(C) Butyl and pentyl amide ester derivatives described by the general formula, $$\begin{array}{l}(CA_b)X\\((CA_d)X_q)_s\\(CA_b)X\;,\end{array}$$

where
A = H, —CH$_3$, —CH$_2$CH$_3$, —(CH$_2$)$_2$CH$_3$, or —CH(CH$_3$)CH$_3$, the A groups being the same or different, subject to the proviso that the number of carbons in the backbone is 4 to 5,
b = 1 to 2,
d = 1 to 2,
X =

$$-O-\overset{O}{\underset{\|}{C}}-R$$

(ester) or

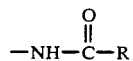

(amide) groups, subject to the proviso that each molecule contain at least one ester and at least one amide group, q=0 to 1, s=0 to 3, independent of q, and each R is, independently, as defined above.

Illustrations of this type of primary amide esters include:

(14) 2,3-Bis(oleoyloxy)butyl 1,4-Dioleamide

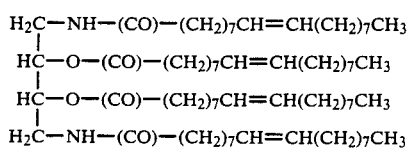

(15) 2-Methyl-1,3-bis(oleoyloxy)propyl 2-Oleamide

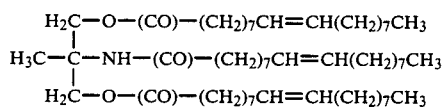

(16) 1,2-Bis(oleoyloxy)butyl 3-Oleamide

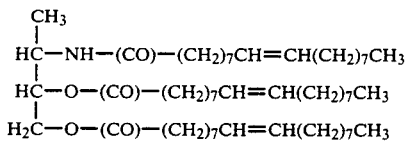

(17) 1,2-Bis(oleoxyloxy)butyl 3-Palmitamide

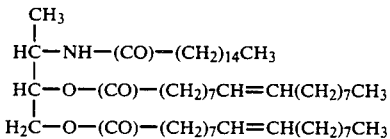

(18) 1,3-Bis(oleoyloxy)pentyl 4-Oleamide

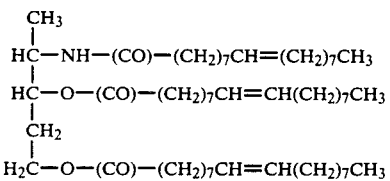

(19) 1,3-Bis(butoxybutyroyloxy)pentyl 4-Butyramide

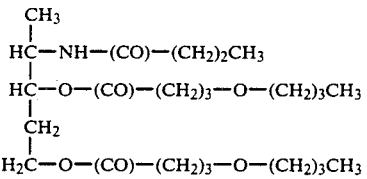

(D) Other primary amide esters of this invention may be described by the general formula,

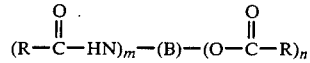

where:

B is an organic radical having 6 carbons, m=1 to 3, n=1 to 3, and each R is, independently, as defined above.

Examples of this type of primary amide ester derivative include:

(20) 1,4,6-Tris(oleoyloxy)hexyl 3-Oleamide

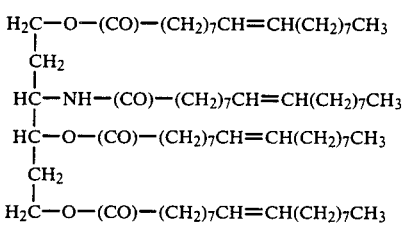

(21) 1,3,5,6-Tetra(lauroyloxy)hexyl 2,4-Dipalmitamide

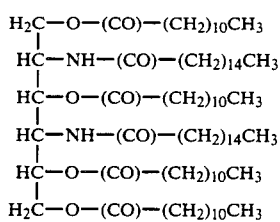

(22) Trans-2-Oleoyloxycyclohexyl Oleamide

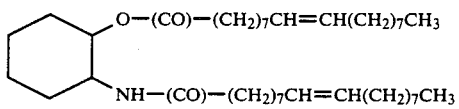

(23) 2-Myristoyloxycyclohex-4-enyl Myristamide

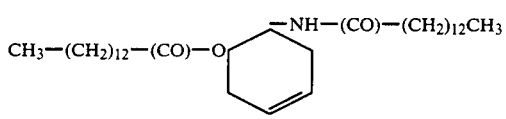

(24) Pentaacylated Galactosamine

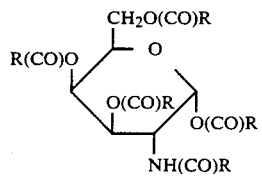

where R is derived from corn oil

(26) Tetraacylated 2-Amino-2-Deoxyribose

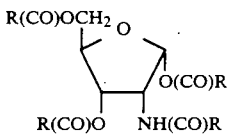

where R is derived form soybean oil

EXAMPLES

The following examples are presented to further illustrate and explain the present invention and should not be taken as limiting in any regard. Unless otherwise indicated, all parts and percentages are by weight, and are based on the weight at the particular stage of the processing being described. The proton nmr spectra are consistent with the structures for which they are reported.

EXAMPLE 1

2-Oleoyloxypropyl 1,3-dioleamide, a primary amide ester of this invention, is synthesized in this example.

Oleoyl chloride (100 mL, 0.3 mole) is added dropwise to a solution of 1,3-diamino-2-propanol (9.0 g, 0.1 mole) in 35 mL pyridine at 0° C. A yellow precipitate of pyridinium chloride is produced in the dark brown solution which is stirred at room temperature for one hour. The mixture is filtered, the filtrate is diluted with ethyl acetate and washed with 5% HCl, water, and is dried over magnesium sulfate. Filtration and evaporation give 83.5 g of crude product, a 15 g portion of which is chromatographed on silica gel. Elution (12:1 hexane: ethyl acetate) and subsequent evaporation affords a 5.4 g sample of the title compound.

Proton nmr spectrum in chloroform-d: 5.35 (multiplet, 10 H, HC=CH), 5.16 (quintet, 1 H, methine proton), 3.97 and 3.76 (two doublets of doublets, 4 H, N—CH$_2$), 2.80–2.59 (overlapping triplets, 8 H, (—CH$_2$—CO)$_2$N), 2.20 (triplet, 2 H, —CH$_2$— CO$_2$), 2.02 (multiplet, 20 H, C=C—CH$_2$), 1.62, 1.52 and 1.30 (multiplets, 110 H, —CH$_2$—) and 0.89 (triplet, 15 H, —CH$_3$)

EXAMPLE 2

2,3-Bis(oleyoyloxy)propyl oleamide, another primary amide ester fat mimetic of this invention, is synthesized in this example.

With ice bath cooling, a solution of oleoyl chloride (37.3 g, 0.124 mole) in 30 mL hexane is added to a stirred solution of 1-amino-2,3-propanediol in 60 mL pyridine. The course of the reaction at 0° C. is monitored by thin layer chromatography. After the addition is complete, the reaction mixture is heated to 50° C. for 45 minutes, at which point secondary amide by-product begins to appear. The mixture is cooled to room temperature, and diluted with ethyl acetate. This solution is washed successively with 5% sodium carbonate 3×50 mL) and water (2×50 mL) then dried over magnesium sulfate. Filtration and subsequent evaporation afford a viscous red-brown oil (31.9 g). A seven gram portion is chromatographed on a silica gel column (elution with 90:10:5 (v/v/v) hexane:ethyl acetate:acetic acid) to give, upon evaporation, 2.4 g of the title composition.

Proton nmr spectrum in chloroform-d: 5.79 (triplet, 1 H, N—H), 5.35 (multiplet, 6 H, HC=CH), 5.10 (quintet methine H), 4.27 and 4.13 (two doublets of doublets, 2 H, O—CH$_2$), 3.50 (apparant quartet, 2 H, N—CH$_2$), 2.32 (triplet, 4 H, CH$_2$—CO$_2$—), 2.18 (triplet, 2 H, CH$_2$—ON—), 2.02 (multiplet, 12 H, C=C—CH$_2$), 1.62 and 1.31 (multiplets, 66 H, —CH$_2$—) and 0.89 (triplet, 9 H, —CH$_3$).

EXAMPLE 3

1,3-Bis(oleoyloxy)propyl 2-oleamide, another primary amide ester fat mimetic of this invention, is synthesized in this example.

To a magnetically stirred solution of serinol hydrochloride (3.0 g, 0.024 mole) in 80 mL of dry pyridine at 0° C. is added, dropwise, 30.0 g (0.1 mole) of oleoyl chloride. After the addition is complete, the solution is warmed to 60° C. for 30 minutes. The reaction mixture is cooled, filtered, and diluted with 100 mL ethyl acetate. The solution containing the product is washed successively with 5% HC$_1$ (2×100 mL), saturated NaC$_1$ (100 mL) and water (100 mL). After drying over magnesium sulfate the solution is filtered and concentrated and the residue purified by chromatography on silica gel to give 2.7 g of a colorless oil.

Proton nmr spectrum in chloroform-d: chemical shift in ppm (multiplicity, intensity, assignment): 5.73 (doublet, 1 H, N—H), 5.32 (multiplet, 6 H, HC—CH), 4.48 (multiplet, 1 H, methine proton), 4.23 and 4.07 (two doublets of doublets, 4 H, CH$_2$—O), 2.32 (triplet, 4 H, CH$_2$—CO$_2$), 2.16 (triplet, 2 H, CH$_2$—CON), 2.05 (multiplet, 12 H, C=C—CH$_2$), 1.60 (multiplet, 6 H, CH$_2$—C— C=O), 1.30 (multiplet, 30 H, CH$_2$) and 0.89 (triplet, 9 H, CH$_3$).

EXAMPLE 4

2-Methyl-1,3-bis(oleoyloxy)propyl 2-oleamide, another fat mimetic of this invention, is prepared in this example.

To a magnetically stirred solution of 2.10 g (0.02 mole 2-amino-2-methyl-1,3-propanediol in 35 mL pyridine at 0° C. is added dropwise 18.0 g (0.06 mole) oleoyl chloride. After stirring for three hours, the reaction mixture is filtered. The filtrate is diluted with 100 mL ethyl acetate and is washed with 5% HC$_1$ (3×50 mL), saturated NaC$_1$ (50 mL) and water (50 mL). After drying over magnesium sulfate, the solvent is evaporated to give a red-brown oil. Chromatography over silica gel affords 5.5 g of the title compound.

Proton nmr in chloroform-d: chemical shift in ppm (multiplicity, intensity, assignment): 5.78 (singlet, 1 H, NH), 5.34 (multiplet, 6 H, HC=CH), 4.27 (center of AB quartet, 4 H, CH$_2$—O), 2.32 (triplet, 4 H, CH$_2$—C=O), 2.11 (triplet, 2 H, CH$_2$—CON), 2.00 (multiplet, 12 H, CH$_2$—C=C), 1.60 (multiplet, 6 H, CH$_2$—C—C=O), 1.41 (singlet, 3 H, CH$_3$—C—N), 1.30 (multiplet, 30 H, CH$_2$) and 0.89 (triplet, 9 H, CH$_3$).

EXAMPLE 5

2-Oleoyloxy-propyl oleamide, another fat mimetic of this invention, is prepared in this example.

To a magnetically stirred solution of 7.5 g (0.1 mole of 1-amino-2-propanol in 60 ml pyridine at 0° C. is added, dropwise, 57.8 g (nearly 2 equivalents) of distilled oleoyl chloride. The acid chloride was purposely kept as the limiting reagent so as to minimize secondary amide formation. After stirring for 3 hours, the reaction was worked up in the usual fashion (5% HCl wash, H$_2$O wash, MgSO$_4$ dry). Upon filtration and solvent removal 53.4 g of orange-brown crude product was obtained. This was purified on silica gel using 4:1 hexane: ethyl acetate, to yield 35.4 g of pure title product.

Proton nmr in chloroform-d: chemical shift in ppm (multiplicity, intensity, assignment): 5.78 (multiplet, 1 H, NH), 5.34 (multiplet, 4 H, CH=CH), 4.99 (multiplet, 1 H, CHO), 3.3–3.5 (multiplets, 2 H, $CH_2N$), 2.3 (triplet, 2 H, $CH_2COO$), 2.15 (triplet, 2 H, $CH_2CON$), 2.0 (multiplet, 8 H, $CH_2C=C$), 1.6 (multiplet, 4 H, $CH_2$—C—CO), 1.3 (multiplet, 40 H, $CH_2$), 0.89 (triplet, 6 H, $CH_3$).

EXAMPLE 6

3-Oleoyloxy-propyl oleamide, another primary amide ester derivative of this invention, is synthesized in this example.

To a magnetically stirred solution of 15.8 g (0.20 mole) 3-amino-1-propanol in 40 ml pyridine at 0° C. was added, dropwise, 97.83 g (0.33 mole) distilled oleoyl chloride. The amount of acid chloride used was kept under 2 equivalents so as to minimize secondary amide formation. Following the usual workup (5% $HC_1$ wash, $H_2O$ wash, $MgSO_4$ drying), 68.4 g of dark amber crude product was obtained. At room temperature this is a solid. A 2 g portion of this was treated with cold methanol and filtered to obtain a nearly white solid.

Proton nmr in chloroform-d: chemical shift in ppm (multiplicity, intensity, assignment): 5.73 (multiplet, 1 H, NH), 5.35 (multiplet, 4 H, CH=CH), 4.14 (triplet, 2 H, $CH_2OCO$), 3.30 (quartet, 2 H, $CH_2N$), 2.31 (triplet, 2 H, $CH_2CO_2$), 2.16 (triplet, 2 H, $CH_2CON$), 2.02 (multiplet, 8 H, $CH_2C=C$) 1.83 (quintet, 2 H, C—$CH_2$—C), 1.62 (multiplet, 4 H, $CH_2$—C—CO), 1.3 (multiplet, 4 OH, $CH_2$), 0.89 (triplet, 6 H, $CH_3$).

EXAMPLE 7

2-Myristoyloxypropyl 1,3-dimyristamide, another primary amide ester of this invention, is synthesized in this example.

Myristoyl chloride (36.7 g, 0.15 mole) and 1,3-diamino-2-propanol (4.5 g, 0.05 mole) are combined in a flask containing a magnetic stir bar and fitted with a thermometer and a vacuum adapter. The solution is mixed under vacuum and warmed to 100° C. for 4 hours. Upon cooling to room temperature, a solid is obtained.

EXAMPLE 8

This example outlines the procedure for estimating the in vitro digestibility of the synthetic fat mimetics of this invention.

Preparation of Reagents and Materials

1. Buffer: A pH 7.1 phosphate buffer is prepared by dissolving 6.8 g $KH_2PO_4$ in 1 L of millipore filtered water (to yield 0.05 M phosphate). Fifty mg $Ca(NO_3)_2$ is added and 5.0 g cholic acid (Na salt, an ox bile isolate from Sigma) to give 0.3 mM Ca++ and 0.5 % cholic acid in 0.05 M phosphate. The pH is adjusted to approximately 7.1 with solid NaOH. Several drops of Baker "Resi-analyzed" toluene are added to prevent bacterial growth during storage at 3°–5° C. 2. Lipase: About 15 mg/mL commercial porcine pancreatic lipase from U.S. Biochemical Corporation is dissolved in buffer.

3. Substrates and Standards: A 1.0 mL volumetric flask is charged with an amount of lipid substrate calculated to give a concentration of 200 nanomoles per microliter in Baker "Resianalyzed" toluene. (The proper concentration may be approximated by doubling the molecular weight of the lipid in question, dividing by 10, and diluting to the mark; this yields about 200 nanomoles per microliter.) This preparation affords the substrate to be used in the hydrolysis reactions.

Fatty acids and glyceride standards from Nu Chek or Sigma are prepared for elution on TLC plates (prewashed with 1:1 chloroform/methanol) by diluting the substrate solution with 10:1 toluene (1 part substrate plus 9 parts toluene) in septum vials.

Procedure:

In a 25 mL Erlenmeyer, emulsify 20 mL buffer and 40 microliters of substrate using an ultrasonic disrupter at a microtip maximum setting for approximately 10 seconds. This results in a 0.4 microliter/milliliter emulsion. Place in a 37° C. water bath and stir vigorously. After temperature equilibration, add 40 microliters of enzyme solution and start timing. Remove 5.0 mL aliquots at convenient time intervals for analysis. To establish a standard curve for triolein, aliquots are taken at 10, 20, 30 and 40 minutes.

Add the aliquot to a 15 mL glass centrifuge tube containing a drop of concentrated HCl. Add approximately 3 mL of a 2:1 mixture of $CHCl_3:CH_3OH$ and shake vigorously. Centrifuge at approximately 5000 rpm for 5 minutes and transfer the bottom layer with a Pasteur pipet to a 5 mL septum vial. Repeat the extraction step once and combine the two bottom layers. Evaporate the solvent in nitrogen gas. After about half of the solvent is removed, add an equivalent volume absolute ethanol and continue evaporation in a nitrogen stream until dryness is achieved. Samples may be warmed with a heat gun to facilitate drying.

When the samples are dry, add exactly 200 microliters of toluene containing 10% DMSO, cap tightly, and spot TLC plate with 2.0 microliters per channel. (If 100% extraction efficiency of a zero time control is achieved, this amounts to 20 nanomoles of substrate spotted on the plate.) Develop with a suitable solvent system, for example, hexane: ethyl ether: chloroform: acetic acid in a volume ratio of 60:20:20:1. After 15 cm elution, dry plate with a heat gun and determine amounts of starting substrate and products of hydrolysis by scanning 10 to 20 nanomoles per channel at a wavelength of 190 nm using the CAMAG TLC Scanner II densitometer equipped with a Spectra Physics 4270 integrator and comparing with controls run at the same time.

Results

Using this procedure and enzyme system, triolein, a triglyceride control, is substantially hydrolyzed in 10 minutes. Under the same conditions, the primary amide ester fat mimetics prepared in Examples 2 through 5 are hydrolyzed with pancreatic lipase as follows:

| primary amide ester fat mimetic | % hydrolysis |
| --- | --- |
| 2,3-bis(oleoyloxy)propyl oleamide prepared in Example 2 | 50% |
| 1,3-bis(oleoyloxy)propyl 2-oleamide prepared in Example 3 | 50% |
| 2-methyl-1,3-bis(oleoyloxy)propyl-2-oleamide prepared in Example 4 | 10% |

EXAMPLE 9

This example illustrates how the novel fat mimetics of this invention are screened for caloric availability by a carefully controlled in vivo animal feeding study.

An experimental relationship between total calories ingested and animal body weight gain is established by monitoring the body weight gain associated with consumption of a nutritionally balanced diet containing varying concentrations of a reference substance such as corn oil which has a known caloric availability. Correlations between total calories ingested and body weight gain are excellent (r=0.99).

Procedure

Caloric availability of a test material is evaluated by substituting a specific weight of the test material for the reference substance and observing the body weight gain. The gain in body weight is equated to a total number of calories using the correlation previously established for the reference data. The estimated number of calories ingested are divided by the weight of test material to give the apparent calories per gram for the test material. Generally speaking, in these bioavailability studies, the degree of perianal pelt soiling correlates with reduced bioavailability.

The test animals are six-week-old male Sprague-Dawley rats obtained from the Portage, Michigan facility of the Charles River Laboratories, Inc. After acclimation for 15 days, the test duration is 14 days. The dietary requirements are established by observing the actual feed consumption of animals provided with unlimited feed. All diets are prepared to contain 50% of the established dietary requirements plus any supplements of reference or test materials. In all tests so designed the test animals are maintained in very good health.

The test feeds are AIN-76A and fortified AIN-76A (hereinafter abbreviated "fort") AIN-76A (Teklad). The major components of these diets are as follows:

| component | AIN-76A | fortified AIN-76A |
| --- | --- | --- |
| casein | 20% | 40% |
| corn starch | 15 | 8.08 |
| sucrose | 50 | 26.02 |
| fiber | 5 | 5 |
| corn oil | 5 | 5 |
| AIN mineral mix | 3.5 | 7 |
| AIN vitamin mix | 1 | 2 |
| choline | 0.2 | 0.4 |
| methionine | 0.3 | 0.6 |
| total | 100% | 100% |
| calc. caloric density | 3.85 kcal/gm | 3.9 kcal/gm |

Using these diets supplemented by microencapsulated corn oil (9.0 kcal/gm), average body weight (hereinafter abbreviated "wgt") gains for example animal groups A and B are as follows:

| | Animal Group A | | Animal Group B | |
| --- | --- | --- | --- | --- |
| diet supplied | wgt gain (grams) | calories consumed | wgt gain (grams) | calories consumed |
| ad lib AIN-76A | 73.6 | 1275 | 82.4 | 1370 |
| 50% fort | −3.4 | 651 | −3.8 | 691 |
| 50% fort + 7.75% gelatin | 9.0 | 705 | 8.3 | 747 |
| 50% fort + 7% corn oil | 13.9 | 768 | 15.2 | 831 |
| 50% fort + 14% corn oil | 28.3 | 913 | 37.9 | 998 |
| 50% fort + 21% corn oil | 57.7 | 1093 | 63.3 | 1183 |

Results

Rats were fed a diet of 50% fort and 21% 2,3-bis-(oleoyl oxy)propyl oleamide prepared in Example 2 as a test compound under the foregoing procedure, and their average weight gain was determined. Using the base line control data and the data from the test compound, it was determined that 2,3-bis(oleoyloxy)propyl oleamide gave about 3.3 kcal/gram upon being metabolized.

EXAMPLE 10

Sweet Chocolate. A low calorie sweet chocolate may be prepared by combining:

| Ingredient | parts |
| --- | --- |
| Cocoa Powder | 1.0 |
| Sugar | 1.0 |
| To this is added a portion of | |
| Example 7 Amide Ester | 1.0 | and the ingredients are mixed thoroughly and passed through a refiner to reduce the particles to desired size. The material is conched, and the remaining amide ester is added. The mixture is poured into molds and quench cooled. No tempering regimen is necessary.

Chocolate Chips. The chocolate prepared above may be melted and deposited into nibs in the usual process.

EXAMPLE 11

Sugar Cookies. Sugar Cookies may be prepared by blending:

| Ingredient | parts |
| --- | --- |
| Sugar | 231 |
| Example 1 Amide Ester | 114 |
| Salt | 3.7 |
| Sodium Bicarbonate | 4.4 |
| Water | 37.4 |
| 5.9% Dextrose Solution (wt/wt) | 58.7 |
| Flour | 391 |

All of the ingredients are creamed together. The dough so formed may be extruded and baked by the usual process.

EXAMPLE 12

Margarine. Margarine may be prepared by combining the ingredients for the following two phases:

| | parts |
| --- | --- |
| Oil Phase Ingredients | |
| Example 5 Primary Amide Ester | 59.0 |
| Soybean Hardstock (IV 65) | 40.0 |
| Emulsifier | 1.0 |
| Aqueous Phase Ingredients | |
| Water | 95.8 |
| Milk Solids | 2.0 |
| Salt | 2.0 |
| Citric Acid | 0.1 |
| Beta Carotene | 0.1 |

The phases are emulsified in an oil:aqueous phase ratio of 80:20, and passed through a cool scraped surface heat exchanger in the usual process.

EXAMPLE 13

Flavor Bits. Flavor bits for incorporation into baked goods may be prepared by combining the following ingredients:

| Ingredient | parts |
|---|---|
| Sucrose | 215 |
| Water | 180 |
| Corn Syrup | 160 |
| Example 12 Margarine | 28 |
| Flavor | 12 |
| Citric Acid | 10 |
| Glycerine | 8 |
| Salt | 5 |
| Dye | 1 |

The first three ingredients are heated to 290° F. and the heat removed. Margarine is mixed in, and the mixture allowed to cool to 160°–170° F. before adding the remaining ingredients. (Almost any flavoring material may be used as flavor, for example, butterscotch or nut.) The mixture is then poured into a cold aluminum pan and frozen in dry ice. The frozen mixture is then cracked and milled into bits.

EXAMPLE 14

Butterscotch Cookies. Butterscotch cookies may be prepared by blending:

| Ingredient | parts |
|---|---|
| Flour | 22.0 |
| Example 3 Amide Ester | 20.0 |
| Salt | 0.7 |
| Sodium Bicarbonate | 0.1 |
| Monocalcium Phosphate | 0.1 |
| Vanillin | 0.1 |
| Water | 8.0 |
| and mixing well. To this is added | |
| Sugar | 30.0 |
| which is mixed until dispersed. Then | |
| Example 13 Butterscotch Bits | 19.0 | are mixed in until just blended prior to depositing and baking by the usual process.

EXAMPLE 15

Vanilla Wafers. Combine and mix well:

| Ingredient | parts |
|---|---|
| Flour | 40 |
| Sugar (10X) | 28 |
| Example 6 Amide Ester | 13 |
| Frozen Whole Eggs | 6.0 |
| High Fructose Corn Syrup | 4.0 |
| Salt | 0.7 |
| Vanilla | 0.3 |
| Sodium Bicarbonate | 0.3 |
| Sodium Aluminum Phosphate | 0.1 |
| Ammonium Bicarbonate | 0.1 |
| Water | 7.5 |

Aerate, deposit onto a baking surface and bake in the usual manner.

EXAMPLE 16

Chocolate Chip Cookies. Chocolate chip cookies may be prepared using the butterscotch cookie recipe of Example 14, but substituting

| Ingredient | parts |
|---|---|
| Example 12 Margarine | 10.0 |
| Example 6 Amide Ester | 10.0 |
| for the fat mimetic ingredient, | |
| Granulated Sugar | 15.0 |
| Brown Sugar | 15.0 |
| for the sugar, and | |
| Example 10 Chocolate Chips | 19.0 |
| for the butterscotch bits. | |

EXAMPLE 17

Filled Cream. To make a "filled cream" composition, homogenize, in a conventional dairy homogenizer, about

| Ingredient | parts |
|---|---|
| Example 1 Amide Ester | 30 |
| with Skim Milk | 69.9 |
| and Polysorbate 80 | 0.1. |

EXAMPLE 18

Ice Cream. Vanilla ice cream may be prepared by mixing

| Ingredient | parts |
|---|---|
| Sugar (10X) | 15.0 |
| Nonfat Dry Milk | 3.9 |
| Salt | 0.4 |
| into Water | 39.0 |
| for 3 minutes. Then add melted | |
| Example 7 Amide Ester | 28.4 |
| and cook to 200° F. while mixing. | |
| Hold for 1 minute. Cool to 160° F., | |
| and add | |
| Sugared Egg Yolks | 12.5 |
| Vanilla Extract | 0.8 | and mix 1 minute. Cool and freeze to desired overrun.

EXAMPLE 19

Filled Milk. To prepare a "filled milk" composition, combine about

| Ingredient | parts |
|---|---|
| Example 17 Filled Cream | 100 |
| Skim Milk | 900 |
| and rehomogenize. | | and rehomogenize.

EXAMPLE 20

Cheese Products. To prepare cheese products, treat

| Ingredient |
|---|
| Example 19 Filled Milk | made with a 1:1 mixture of Examples 1 and 5 primary amide ester fat mimetics is used like natural milk in the normal cheese making process (as is practiced, for example in the production of Cheddar or Swiss cheese). Preferably add

| | parts |
|---|---|
| Butter Oil | 10 | to the fat mimetic portion of the filled milk product before it is employed in this process to enhance the proper flavor development of the cheese products.

EXAMPLE 21

Butter Cream Icing. Butter cream icing may be prepared by blending:

| Ingredient | parts |
|---|---|
| Sugar | 227.0 |
| Example 3 Amide Ester | 70.8 |
| Water | 28.4 |
| Nonfat Dry Milk | 14.0 |
| Emulsifier | 1.4 |
| Salt | 1.0 |
| Vanilla | 1.0 |

All of the ingredients are creamed in a mixer at medium speed.

EXAMPLE 22

Crackers. A dough prepared by mixing together

| Ingredient | parts |
|---|---|
| Flour | 100 |
| Sugar | 5.0 |
| Malt | 1.5 |
| Example 6 Amide Ester | 7.5 |
| Salt | 1.0 |
| Sodium Bicarbonate | 0.9 |
| Nonfat Dry Milk | 2.5 |
| High Fructose Corn Syrup | 2.5 |
| Monocalcium Phosphate | 0.75 |
| Water | 28 | is sheeted, stamped, and baked to produce a cracker product.

EXAMPLE 23

Sprayed Crackers. The sheeted and stamped cracker dough of Example 22 may be sprayed with the primary amide ester of Example 1 after baking.

EXAMPLE 24

Mayonnaise. Mayonnaise can be prepared by adding

| Ingredient | parts |
|---|---|
| Water | 5.0 |
| to Sugar | 1.5 |
| and Spices | 3.5 |
| and mixing three minutes. To this is added | |
| Salted Egg Yolks | 8.0 |
| followed by mixing two minutes, and adding | |
| Example 1 Amino Acid Derivative | 40 |
| and Corn Oil | 40 |
| then 120 Distilled Vinegar | 2.0 |

The mixture is blended 3 minutes and passed through a colloid mill set at 60 prior to filling in the usual process.

EXAMPLE 25

Pudding. Pudding can be prepared from the following formulation:

| Ingredient | parts |
|---|---|
| Milk | 67 |
| Sugar | 11 |
| Starch | 5 |
| Water | 9 |
| Flavor | 3 |
| Example 4 Amide Ester | 5 |

The ingredients can be blended together and heated to form a pudding.

EXAMPLE 26

Frying Oil. The amide of Example 7 with 1 ppm polydimethylsiloxane may be used for frying food snacks. For frying potatoes, omit the polydimethylsiloxane.

EXAMPLE 27

Frying Oil. One part frying oil of Example 26 with one part peanut oil may be used for frying foods.

EXAMPLE 28

Pet Food. Dry, expanded animal food kibs may be prepared from the following ingredients:

| Ingredient | parts |
|---|---|
| Hominy Feed | 37 |
| 52% Meat Meal | 17 |
| Wheat Shorts | 13 |
| Example 3 Amide Ester | 16 |
| Corn Germ Meal | 9.6 |
| Wheat Germ Meal | 3 |
| Dried Milk | 0.9 |
| Beet Pulp | 1.7 |
| Fish Scrap | 0.5 |
| Brewer's Yeast | 0.5 |
| Salt | 0.5 |
| Vitamins and Minerals | 0.1 |

The ingredients are mixed together and water added to raise the water content to 27%, before extrusion, pelleting, and drying in the usual manner.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A food composition comprising fat ingredients and nonfat ingredients and having said fat ingredients at least partially replaced by a fat mimetic compound of the formula

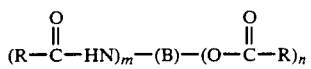

B is an acyclic aliphatic group having from 2 to 6 carbons, m = 1 to 3, $n = 1$ to 3, and each R is, independently, a $C_1$ to $C_{29}$ aliphatic group, a $C_2$ to $C_{29}$ ether group of the formula $R'-O-R''-$, or a $C_2$ to $C_{29}$ ester group of the formula $$R''-O-(CO)-R'- \text{ or } R'-(CO)-O-R''-,$$

where $R'-$ and $R''-$ are, independently, aliphatic groups.

2. The composition according to claim 1 wherein B contains 3 carbon atoms.

3. The composition according to claim 1 wherein $m+n=3$.

4. The composition according to claim 1 wherein R comprises $C_3$ to $C_{23}$ aliphatic groups.

5. The composition according to claim 1 wherein R is derived from fatty acids selected from the group consisting of acetic, propionic, butyric, caproic, caprylic, pelargonic, capric, undecanoic, lauric, myristic, palmitic, stearic, arachidic, behenic, lignoceric, cerotic, montanic, mellisic, palmitoleic, oleic, vaccenic, linoleic, linolenic, eleostearic, arachidonic, nervonic, eicosapentaenoic, docosatetraenoic, docosapentaenoic, and docosahexaenoic acids, and mixtures thereof.

6. The composition according to claim 1 wherein R is derived from non-hydrogenated or hydrogenated oils selected from the group consisting of soybean, safflower, sunflower, sesame, peanut, corn, olive, rice bran, canola, babassu nut, coconut, palm, palm kernel, lupin, nasturtium seed, mustard seed, cottonseed, low erucic rapeseed, butter and marine oils, and fractions thereof.

7. An edible fat composition comprising an acylated alkanolamine having a four to six carbon backbone to which are attached $C_1$ to $C_{29}$ aliphatic, ether or ester groups in at least one ester and at least one primary amide linkage.

8. The composition according to claim 7 wherein the alkanolamine is selected from the group consisting of aminobutanol, diaminobutanol, aminobutanediol, diaminobutanediol, aminopentanol, diaminopentanol, aminopentanediol, and diaminopentanediol.

9. The composition according to claim 7 wherein the $C_1$ to $C_{29}$ groups are aliphatic.

10. The composition according to claim 9 wherein the aliphatic groups have 3 to 23 carbons.

11. The composition according to claim 7 wherein the backbone has four carbons and the number of $C_1$ to $C_{29}$ groups is three.

12. A food composition having a fat ingredient at least partially replaced by an acylated ethanolamine compound of the formula, $$R-(CO)-HN-CH_2-CH_2-O-(CO)-R,$$

where each R is, independently, a $C_1$ to $C_{29}$ aliphatic group, a $C_2$ to $C_{29}$ ether group of the formula $R'-O-R''-$, or a $C_2$ to $C_{29}$ ester group of the formula $$R''-O-(CO)-R'- \text{ or } R'-(CO)-O-R''-,$$

where $R'-$ and $R''-$ are, independently, aliphatic groups.

13. A food composition comprising an ingredient selected from the group consisting of flour, starch, sugars, mil, salt, emulsifiers, eggs, and meat, and having a fat ingredient at least partially replaced by a propyl amide ester compound of the following formula:

$$\begin{array}{c} (CH_2)X \\ | \\ (CH_d)X_q \\ | \\ (CH_e)X_t, \end{array}$$

where
$d = 1$ to 2,
$e = 1$ to 3,
$q = 0$ to 1,
$t = 0$ to 1,
$X =$ $$-O-\overset{\overset{\displaystyle O}{\|}}{C}-R$$

ester or $$-NH-\overset{\overset{\displaystyle O}{\|}}{C}-R$$

amide groups, subject to the proviso that each molecule contain at least one ester and at least one amide group, subject to the proviso that $q+t \geq 2$, and each R is, independently, a $C_1$ to $C_{29}$ aliphatic group, a $C_2$ to $C_{29}$ ether group of the formula $R'-O-R''-$, or a $C_2$ to $C_{29}$ ester group of the formula $$R''-O-(CO)-R'- \text{ or } R'-(CO)-O-R''-,$$

where $R'-$ and $R''-$ are, independently, aliphatic groups.

14. The composition according to claim 13 wherein $e=2$, $d=1$, and $q+t=2$.

15. The composition according to claim 13 wherein $d=1$, $e=3$, and $q=1$.

16. A food composition having a fat ingredient at least partially replaced by a compound of the formula:

$$\begin{array}{c} (CA_b)X \\ | \\ ((CA_d)X_q)_s \\ | \\ (CA_b)X \end{array},$$

where
$A = H$, $-CH_3$, $-CH_2CH_3$, $-(CH_2)_2CH_3$, or $-CH(CH_3)CH_3$, the A groups being the same or different, subject to the proviso that the number of carbons in the backbone is 4 to 5, $b = 2$,
$d = 1$ to 2,
$X = O-(CO)-\$$ ester or $-NH-(CO)-R$ amide groups, subject to the proviso that each molecule contain at least one ester and at least one amide group, $q = 0$ to 1,
$s = 0$ to 3, independent of q, and
each R is, independently, a $C_1$ to $C_{29}$ aliphatic group, a $C_2$ to $C_{29}$ ether group of the formula $R'-O-R''-$, $$R''-O-(CO)-R'- \text{ or } R''-(CO)-O-R''-,$$

where R'— and R"— are, independently, aliphatic groups.

17. The composition according to claim 16 wherein s=q=1.

18. The composition according to claim 16 wherein s=2 and q=1.

19. The composition according to claims 7 to 18 wherein the $C_1$ to $C_{29}$ groups are aliphatic.

20. The composition according to claim 19 wherein the groups have 3 to 2 carbons.

21. The composition according to claims 7 to 18 wherein the attached groups are ether groups.

22. The composition according to claims 7 to 18 wherein the attached groups are ester groups.

23. The composition according to claims 7 to 18 wherein the aliphatic, ether or ester groups are derived from fatty acids selected from the group consisting of acetic, propionic, butyric, caproic, caprylic, pelargonic, capric, undecanoic, lauric, myristic, palmitic, stearic, arachidic, behenic, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, and docosahexaenoic acids, and mixtures thereof.

24. The composition according to claims 7 to 18 wherein the aliphatic, ether or ester groups are derived from non-hydrogenated or hydrogenated oils selected from the group consisting of soybean, safflower, sunflower, sesame, peanut, corn, olive, rice bran, canola, babassu nut, coconut, palm, palm kernel, lupin, nasturtium seed, mustard seed, cottonseed, low erucic rapeseed, butter, and marine oils, and fractions thereof.

25. In a food composition containing fat ingredients and nonfat ingredients, the improvement wherein at least a portion of the digestible fat ingredient is replaced by a fat composition characterized by the presence of a fatty acid ester and fatty acid primary amide attached to an alkanolamine having a two- to six-carbon backbone.

26. The improvement of claim 25 wherein the fatty acid ester and fatty acid primary amide are derived from fatty acids having 4 to 24 carbon atoms.

27. A food composition having a fat ingredient at least partially replaced by a fat mimetic compound of the formula

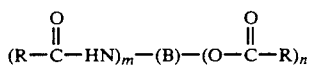

where:
B is an acyclic aliphatic group having from 2 to 6 carbons,
m = 1 to 3,
n = 1 to 3, and
each R is, independently, a $C_1$ to $C_{29}$ aliphatic group, a $C_2$ to $C_{29}$ ether group of the formula R'—O—R"—, or a $C_2$ to $C_{29}$ ester group of the formula R"—O—(CO)—R"— or R"—(CO)—O—R"—, where R'— and R"— are, independently, aliphatic groups wherein said food composition further comprises an ingredient selected from the group consisting of flour, starch, sugars, mil, salt, emulsifiers, eggs, and meat.

28. The composition of claim 27 wherein m+n=3 and said R groups are aliphatic groups having 3 to 23 carbon atoms.

29. The composition of claim 27 wherein said food composition is a cookie.

30. The composition of claim 29 further comprising sugar, salt, sodium bicarbonate, water, and flour.

31. The composition of claim 29 further comprising flour, salt, sodium bicarbonate, monocalcium phosphate, vanillin, water, and sugar.

32. The composition of claim 31 further comprising butterscotch bits.

33. The composition of claim 31 further comprising margarine, brown sugar, and chocolate chips.

34. The composition of claim 27 wherein said food composition comprises fatty candy.

35. The composition of claim 34 wherein said candy comprises chocolate.

36. The composition of claim 35 further comprising cocoa powder and sugar.

37. The composition of claim 27 wherein said food composition comprises a dairy product.

38. The composition of claim 37 wherein said dairy product is selected from the group consisting of filled cream, filled milk, ice cream, and cheese.

39. The composition of claim 38 wherein said filled cream and filled milk further comprises skim milk.

40. The composition of claim 38 wherein said ice cream further comprises skim milk, sugar, gelatin, flavor and color.

41. The composition of claim 27 wherein said food composition is butter cream icing.

42. The composition of claim 41 further comprising sugar, water, nonfat dry milk, emulsifier, salt and vanilla.

43. The composition of claim 27 wherein said food composition comprises a cracker.

44. The composition of claim 43 further comprising flour, sugar, malt, sodium bicarbonate, nonfat dry milk, high fructose corn syrup, monocalcium phosphate and water.

45. The composition of claim 27 wherein said food composition comprises a pudding.

46. The composition of claim 45 further comprising milk, sugar, starch, water and flavor.

47. The composition of claim 27 wherein said food composition is mayonnaise.

48. The composition of claim 47 further comprising corn oil, salted egg yolks, vinegar, sugar, spices and water.

49. The composition of claim 27 wherein said food composition comprises a frying oil.

50. The composition of claim 49 further comprising peanut oil.

51. The composition of claim 27 wherein said food composition comprises margarine.

52. The composition of claim 51 further comprising soybean hardstock, emulsifier, water, milk solids, salt, citric acid, and beta carotene.

53. The composition of claim 27 wherein said food composition comprises a pet food.

54. The composition of claim 53 further comprising hominy feed, meat meal, wheat shorts, corn germ meal, wheat germ meal, dried milk, beet pulp, brewer's yeast, salt, vitamins, minerals, and water.

55. The composition of claim 27 wherein said food composition is a flavor bit further comprising sucrose, water, corn syrup, flavor, citric acid, glycerine, and salt.

56. The composition of claim 29 wherein said fat mimetic compound is partially digestible.

57. The composition of claim 56 wherein said fat mimetic compound delivers 0.5 to 8.5 kcal/gram upon being metabolized.

58. A method of reducing the calories in a food product having a digestible fat ingredient, in which the digestible fat ingredient is at least partially replaced by a fat mimetic compound of the formula:

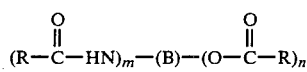

where:
B is an acyclic aliphatic group having from 2 to 6 carbons,
$m = 1$ to 3,
$n = 1$ to 3, and
each R is, independently, a $C_1$ to $C_{29}$ aliphatic group, a $C_2$ to $C_{29}$ ether group of the formula $R'-O-R''-$, or a $C_2$ to $C_{29}$ ester group of the formula $$R''-O-(CO)-R'- \text{ or } R'-(CO)-O-R''-,$$

where $R'-$ and $R''-$ are, independently, aliphatic groups.

59. The method of claim 58 wherein said R groups are aliphatic groups having 3 to 23 carbon atoms and $m + n = 3$.

60. The method of claim 58 wherein said fat mimetic compound is partially digestible.

61. The method of claim 58 in which said food product is a bakery product.

62. The method of claim 58 in which said food product is a frying fat or oil.

63. The method of claim 58 in which said food product is a fatty candy.

64. The method of claim 58 in which said food product is a margarine substitute or blend.

65. The method of claim 58 in which said food product is a frozen dessert.

66. A method for reducing the available calories in a food composition having an edible oil component, which method consists of replacing at least a substantial portion of the edible oil with a compound as defined in any of claims 1 to 18.

* * * * *